United States Patent
Reimer et al.

(10) Patent No.: US 9,749,058 B2
(45) Date of Patent: Aug. 29, 2017

(54) NONLINEAR TOLERANT OPTICAL MODULATION FORMATS AT HIGH SPECTRAL EFFICIENCY

(71) Applicants: Michael Andrew Reimer, Stittsville (CA); Shahab Oveis Gharan, Nepean (CA); Andrew D. Shiner, Ottawa (CA); Maurice O'Sullivan, Ottawa (CA)

(72) Inventors: Michael Andrew Reimer, Stittsville (CA); Shahab Oveis Gharan, Nepean (CA); Andrew D. Shiner, Ottawa (CA); Maurice O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 26 days.

(21) Appl. No.: 14/744,395

(22) Filed: Jun. 19, 2015

(65) Prior Publication Data
US 2016/0373190 A1    Dec. 22, 2016

(51) Int. Cl.
*H04B 10/556*    (2013.01)
*H04B 10/2507*   (2013.01)
(Continued)

(52) U.S. Cl.
CPC ..... *H04B 10/5561* (2013.01); *H04B 10/2507* (2013.01); *H04B 10/516* (2013.01);
(Continued)

(58) Field of Classification Search
CPC  H04B 10/69; H04B 10/5561; H04B 10/2507; H04B 10/516; H04B 10/5161; H04B 10/532; H04L 27/34; H04L 27/3405
(Continued)

(56) References Cited

U.S. PATENT DOCUMENTS

2007/0036171 A1* 2/2007 Magin .............. H04B 3/56
                                                      370/463
2008/0163025 A1* 7/2008 Djordjevic ........ H03M 13/11
                                                      714/755
(Continued)

OTHER PUBLICATIONS

A.D.Shiner,et al., "Demonstration of an 8-dimensional modulation format with reduced inter-channel nonlinearities in a polarization multiplexed coherent system", Optics Express, Aug. 25, 2015, vol. 22. No. 17., pp. 1-9.
(Continued)

*Primary Examiner* — Dalzid Singh
(74) *Attorney, Agent, or Firm* — Integral Intellectual Property Inc.; Miriam Paton; Amy Scouten

(57) ABSTRACT

Techniques for transmitting a data signal through an optical communications system. An encoder is configured to encode the data signal to generate symbols to be modulated onto an optical carrier. Each symbol encodes multiple bits of data and includes a first portion selected from a first constellation and a second portion selected from a second constellation. The first and second constellations have respective different average amplitudes. Each of the first and second constellations have a cardinality of at least two and the cardinality of the first constellation is greater than the cardinality of the second constellation. A modulator is configured to modulate a first frame of the optical signal using the first portion and modulate a second frame of the optical signal using the second portion. A selection of one frame of the optical signal to be used as the first frame encodes at least 1 bit of data.

23 Claims, 4 Drawing Sheets

(51) Int. Cl.
  *H04B 10/516* (2013.01)
  *H04B 10/532* (2013.01)
  *H04B 10/69* (2013.01)
  *H04L 27/34* (2006.01)
(52) U.S. Cl.
  CPC ....... *H04B 10/5161* (2013.01); *H04B 10/532* (2013.01); *H04B 10/69* (2013.01); *H04L 27/34* (2013.01); *H04L 27/3405* (2013.01)
(58) Field of Classification Search
  USPC .......................................................... 398/152
  See application file for complete search history.

(56) References Cited

U.S. PATENT DOCUMENTS

| | | | | |
|---|---|---|---|---|
| 2011/0317784 | A1* | 12/2011 | Schwager | H04L 5/0023 375/295 |
| 2013/0091398 | A1* | 4/2013 | Djordjevic | H04J 14/06 714/752 |
| 2013/0136452 | A1 | 5/2013 | Zhou et al. | |
| 2013/0177306 | A1* | 7/2013 | Pfau | H04B 10/616 398/9 |
| 2014/0133865 | A1 | 5/2014 | Reimer et al. | |
| 2014/0369680 | A1* | 12/2014 | Oveis Gharan | H04L 1/0042 398/27 |
| 2015/0195045 | A1 | 7/2015 | Zhuge et al. | |

OTHER PUBLICATIONS

Mathieu Chgnon, et al, "Analysis and experimental demonstration of novel 8PoISK-QPSK modulation at 5 bits/symbol for passive mitigation of nonlinear impairments", 2013 Optical Society of America, pp. 1-17.

K. Kojima, et al., "Constant Modulus 4D Optimized Constellation Alternative for DP-8QAM", TR2014-083, Mitsubishi Electric Research Laboratories, Sep. 2014, pp. 1-5.

Extended European Search Report for EP16175287.8, mailed Nov. 8, 2016.

* cited by examiner

NONLINEAR TOLERANT OPTICAL MODULATION FORMATS AT HIGH SPECTRAL EFFICIENCY

CROSS-REFERENCE TO RELATED APPLICATIONS

This is the first patent application filed in respect of the present invention.

FIELD OF THE INVENTION

The present application relates generally to communications systems, and more specifically to nonlinear tolerant optical modulation with >4 bits per signaling interval spectral efficiency.

BACKGROUND

In a coherent optical transmission link, a signal proportional to the envelope of the optical electric field is detected. Thus modulation by data implicates phase, amplitude and polarization of the optical field. At near zero residual channel memory the field envelope of a single modulated carrier is a sequence of signaling intervals each characterized by a complex number (amplitude and phase) and polarization which are a representation of the data. Each signaling interval allows one of a constellation of such values where the constellation affects channel capacity. Given a channel capacity and for a linear channel, best performance is obtained for modulations with combined largest minimum Euclidean and lowest proximate Hamming distance normalized over instances of the constellation, weighted according to probability of occurrence. In the presence of optical nonlinearities, further performance optimization requires that the power variance and degree of polarization over signaling intervals be a minimum.

Known methods of performance optimization based on Euclidean/Hamming distances include high dimension sphere packing, set partitioning and trellis coding, Gray labelling, and constellation shaping. Recently, solutions which optimize performance including effects of optical nonlinearity have been devised. For example, co-pending and co-assigned U.S. patent application Ser. No. 13/969,694 filed Aug. 19, 2013 (now U.S. Pat. No. 9,143,238) and Ser. No. 14/644,320 filed Mar. 11, 2015 (published as US 2015/0195045) describe polarization-balanced and power balanced modulation formats that are tolerant of non-linear impairments of an optical transmission system. In both of these applications, the modulation is based on a multi-dimensional symbol constellation that encodes a plurality of bits over multiple signaling intervals. These applications demonstrate that modulation formats applicable to coherent optical transmission systems may be designed so as to reduce the nonlinear interference between co-propagating Wavelength Division Multiplexed (WDM) channels. In particular, so-called power balanced formats, in which each symbol of the constellation alphabet has the same energy, have been shown to reduce inter-channel nonlinear effects such as cross phase modulation (XPM).

Other known multi-dimensional modulation formats are described in: A. Shiner, et al., "Demonstration of an 8-dimensional modulation format with reduced inter-channel nonlinearities in a polarization multiplexed coherent system", Opt. Express, 22(17), pp. 20366-20374 (2014); M Chagnon, et al. "Analysis and experimental demonstration of novel 8PolSK-QPSK modulation at 5 bits/symbol for passive mitigation of nonlinear impairments", Opt. Express 21(25), pp. 30204-30220 (2013); and K. Kojima, et al., "Constant modulus 4D optimized constellation alternative for DP-8QAM", In Proc. ECOC 2014, TR2014-083 (2014).

In a linear channel with Additive White Gaussian Noise (AWGN), the 8PolSK-QPSK power balanced format presented by M. Chagnon et al. increases the ideal back-to-back Required Signal-to-Noise Ratio (RSNR) by ≥0.3 dB relative to other, amplitude modulated formats at 5 bits/interval spectral efficiency and ≥3% uncoded bit error rates (BER) applicable to known Forward Error Correction (FEC) techniques. In this case, the performance gains realized through the reduction of nonlinear interference are at least partially offset by this format's increased sensitivity to additive noise.

The technique described by Kojima et al. provides a power balanced modulation format at 6 bits/interval spectral efficiency equivalent to dual polarization 8 quaternary amplitude modulation (DP-8QAM). Further, the format of Kojima et al. improves the ideal back-to-back RSNR for an uncoded BER of 1% by about 0.38 dB relative to standard DP-8QAM. However, this RSNR improvement is reduced to less than ~0.1 dB at an uncoded BER≥3%, which is commonly encountered in practical optical networks. In addition, the higher-order phase shift keying (PSK) employed in the format of Kojima et al. can be problematic for optical carrier phase recovery in a high phase noise environment. As such, the techniques of Kojima et al. are expected to be of limited use in practical optical communications networks.

To date, modulations which have been commercialized in coherent optical transmission network systems include BPSK, polarization-switched QPSK (also referred to as HEXA or 3QAM), QPSK, 4ASK, and 16QAM on two polarizations. Of these, BPSK, QPSK and 16QAM provide raw spectral efficiencies of 2 bits, 4 bits and 8 bits per signaling interval (bits/interval), respectively. What is lacking is a commercially viable nonlinear tolerant modulation having a 6 bit per signaling interval spectral efficiency.

Other possible network design solutions may include 1) DP-16QAM operating at 0.5×symbol rate with moderately increased WDM channel spacing to achieve a spectral efficiency comparable to a 6 bit/interval format, or 2) DP-QPSK at 1.5×symbol rate to achieve comparable transmission capacity. In the first case, the ideal back-to-back RSNR of DP-16QAM is 2.39 dB worse than DP-8QAM, implying an expected (1.5×2.39)≈3.6 dB reduction in maximum system margin relative to a 6 bit/interval format, while in the second case, the spectral efficiency is reduced by 50%.

Clearly, techniques for implementing nonlinear tolerant modulation formats at 6 bit per signaling interval spectral efficiency that are usable in practical optical communications networks remain highly desirable.

SUMMARY

An aspect of the present invention provides techniques for transmitting a data signal through an optical communications system. An encoder is configured to encode the data signal to generate symbols to be modulated onto an optical carrier. Each symbol encodes multiple bits of data and includes a first portion selected from a first constellation and a second portion selected from a second constellation. The first and second constellations have respective different average amplitudes. Each of the first and second constellations have a cardinality of at least two and the cardinality of the first constellation is greater than the cardinality of the second constellation. A modulator is configured to modulate a first frame of the optical signal using the first portion and modulate a second frame of the optical signal using the second portion. A selection of one frame of the optical signal to be used as the first dimension encodes at least 1 bit of data.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

For the purposes of the present application, a signaling interval is a period of time during which a transmitter is capable of generating an output optical signal having a defined modulation state. The defined modulation state may be represented by any suitable combination of polarization orientation, phase and amplitude of (each orthogonal polarization of) the modulated optical signal. Typically, a modulation format implemented by the transmitter operates to encode 1 or more bits of data to be transmitted as symbols. Each symbol is then modulated onto an optical carrier in a symbol period U, which has a duration equivalent to one or more signaling intervals. Thus, in general the symbol period U≥T, where T is the signaling interval. It is possible to transmit a symbol in one or more signaling intervals that may at least partially overlap in time, for example by using signaling intervals in orthogonal polarizations of an optical carrier, or in respective different sub-carriers.

Figure 1:
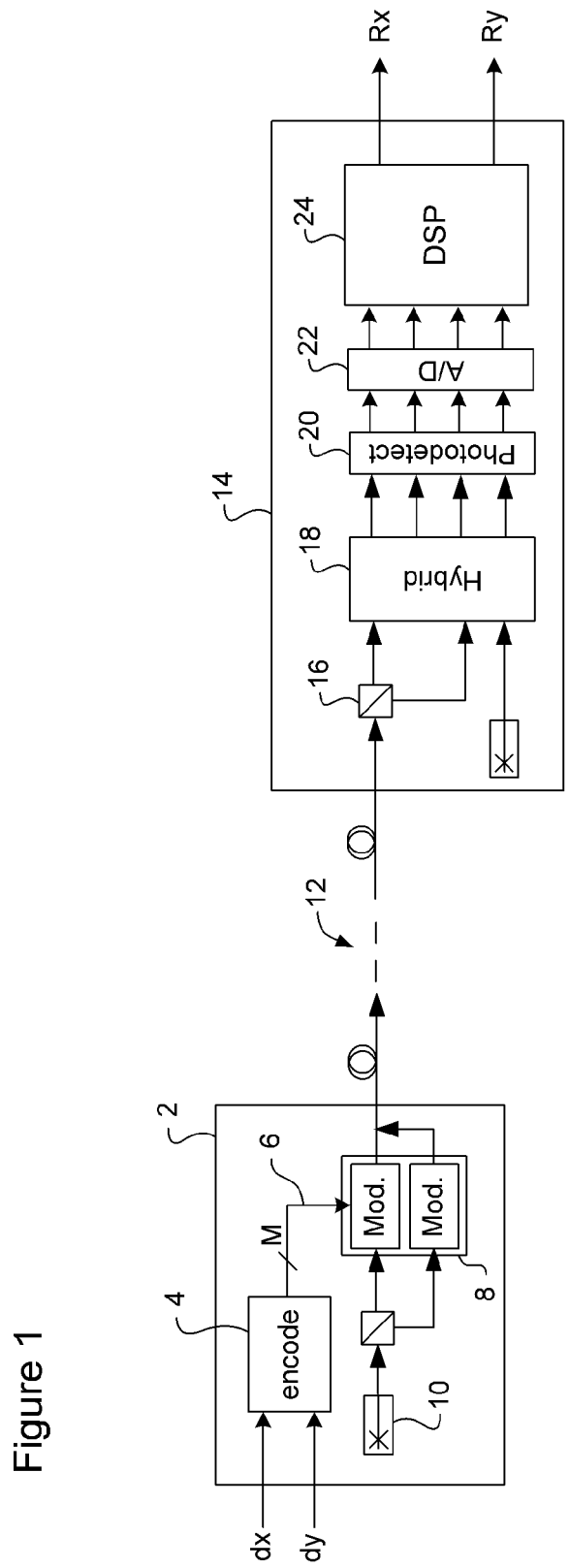
FIG. 1 is a block diagram schematically illustrating elements of a communications system in which methods in accordance with the present invention may be implemented.

FIG. 1 illustrates a representative optical communication system in which techniques in accordance with the present disclosure may be implemented. In the optical communication system of FIG. 1, a transmitter 2 generally comprises an encoder 4 for encoding a pair of data signals (dx and dy) using an M-dimensional constellation to generate a set of drive signals 6. The drive signals are then supplied to a modulator 8 for modulating respective dimensions of an optical carrier in accordance with the drive signals. In the example of FIG. 1, a pair of data signals (dx and dy) may be encoded as four drive signals, which are then used to modulate two dimensions (e.g. phase and amplitude, or I and Q) of each orthogonal polarization of the optical carrier. In some cases, the encoder 4 may be provided as separate symbol encoder, digital driver and analog driver blocks. In such cases, the symbol encoder may operate to encode the data signals (dx and dy) using the M-dimensional constellation to generate symbols, and the digital driver block then processes the symbols to generate one or more sample streams indicative of a target envelope of the modulated optical signal. The analog driver block then processes the sample streams to generate the set of analog drive signals 6. For simplicity of explanation and illustration, the encoder 4 is considered to perform all of these functions. The optical carrier is typically generated by a laser 10 in a manner known in the art, and the modulator may be implemented using any of a variety of known modulator devices, such as phase modulators, variable optical attenuators, Mach-Zehnder interferometers etc. The modulated optical signal appearing at the output of the modulator is transmitted through an optical fiber link 12 to a receiver 14.

The receiver 14 may be provided as a coherent receiver, which includes a polarization beam splitter 16 for splitting the received optical signal into received X and Y polarizations, an optical hybrid 18 for separately mixing the X and Y polarizations with a local oscillator, and a set of photodetectors 20 for detecting the optical power of each of the mixing products generated by the optical hybrid 18. An Analog to Digital (A/D) converter block 22 samples each photodetector current, and the resulting sample streams, each of which represents one of the modulated dimensions of the received optical signal field, are processed by a Digital Signal Processor (DSP) 24 in accordance with the M-dimensional constellation to generate recovered signals Rx and Ry that correspond with the transmitted data signals dx and dy.

In some embodiments it may be useful to consider the optical signal as being comprised of a set of sub-carrier wavelengths developed through appropriate modulation within the optical transmitter. As such, the optical signal at the output of the modulator may be thought to contain a plurality of sub-carrier wavelengths that may be detected and processed within the coherent receiver. For example, sub-carrier wavelengths may be processed either independently or as a set through appropriate digital signal processing in the coherent receiver.

The present application provides techniques for polarization interleaved data transmission with a spectral efficiency of, for example, 6 bits per signaling interval that minimizes nonlinear distortion developed during propagation of the modulated signal through the optical fiber link 12. The present technique utilizes an encoding scheme in which an N-symbol constellation is defined in an M-dimensional space. A data word can be encoded as one or more symbols of the constellation, which can then be modulated by the transmitter 2 onto the available dimensions of the optical signal in one or more signaling intervals of duration T.

A convenient visualization of the M-dimensional constellation is to consider a set of orthogonal 2-dimensional frames, each of which contains a respective 2-dimensional projection of the constellation. In this case, the respective images (projections) of any two frames are related to each other by a rotation of the constellation about at least one axis of the M-dimensional space. Each frame may be associated with the Re-Im (or, equivalently, the I-Q) plane of a linearly polarized optical carrier, and so used in a transmitter to modulate the amplitude and phase of the optical carrier within a signaling interval of duration T. Similarly, the frame associated with a given transmitted polarization can be used in a coherent receiver to detect and decode data symbols of the constellation. By suitable selection of the rotation axes between frames, any two constellation points that have a small Euclidean separation in one frame will have a large Euclidean separation in at least one other frame. Because the separation of any two constellation points is large in at least one frame, encoded $\log_2(N)$-bit data symbols can be unambiguously detected in a coherent receiver by correlating sample streams of each transmitted polarization to the associated frame(s), even in cases where signal-to-noise ratio is very low.

The concept of 2-dimensional frames can also be applied directly to an optical signal. In particular, an optical signal is a multi-dimensional entity that can be considered as a set of 2-dimensional frames (e.g.: phase/amplitude; In-Phase/Quadrature; X- and Y-polarization; etc.) that are distributed across two or more dimensions of the optical signal. For example, a pair of In-Phase/Quadrature frames can be distributed across polarization, signaling interval, carrier (or sub-carrier) wavelength, or combinations thereof. In this case, a symbol constellation frame can be associated with a frame of the optical signal, to identify the optical signal frame that is modulated using constellation points selected from the associated constellation frame.

As noted above, at least two frames are required to unambiguously detect any given encoded data symbol with M≥3. As such, multi-dimensional encoded data symbols with M>4 must be transmitted in at least two signaling intervals, which may be distributed across any one r more of time, polarization angle and optical carrier (or sub-carrier) wavelength. Multi-dimensional encoded data symbols with M≤4 may be transmitted using two polarizations in a single signaling interval.

In embodiments of the present technique, a set of two or more concentric shells are defined. Each shell has a respective different radius, representing an average modulation amplitude of a constellation containing more than one point associated with that shell. The respective cardinality of (i.e. the number of constellation points in) a first one of the constellations is different from the cardinality of a second one of the constellations. Modulation symbols are composed of two or more portions, each portion a constellation point being selected from a respective one of the constellations. Each portion of a symbol may be modulated onto a respective different frame of the optical signal. For example, one portion may be modulated onto the X-polarization, and another portion may be modulated onto the Y-polarization. Alternatively, one portion may be modulated onto a first frame of a first sub-carrier wavelength, and another portion may be modulated onto a different frame of a different sub-carrier wavelength. Other sets of frames may also be used, as desired. The choice of which portion (or constellation) is used to modulate each frame also encodes at least one bit of data.

As may be appreciated, since the selected frames of the optical signal are modulated using symbol portions (constellation points) selected from respective different constellations, known techniques may be used in the receiver to estimate both the most likely constellation point and the most likely constellation from which that constellation point was selected in the transmitter. Based on this information, the most likely value of the data word encoded in the transmitted symbol can be recovered.

Figure 2A:
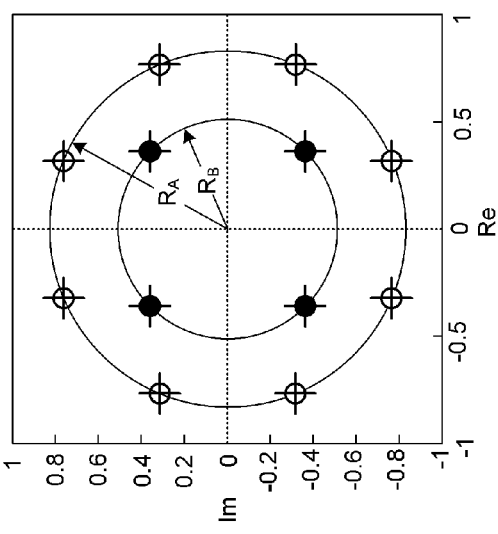
FIGS. 2A-2C illustrate 4D-8QAM modulation in accordance with an embodiment of the present invention.
Figure 2C:
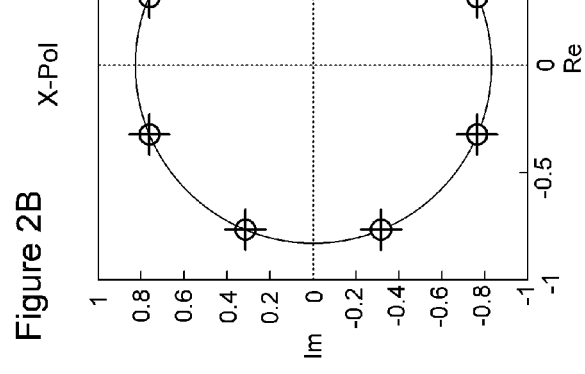
Figure 2B:
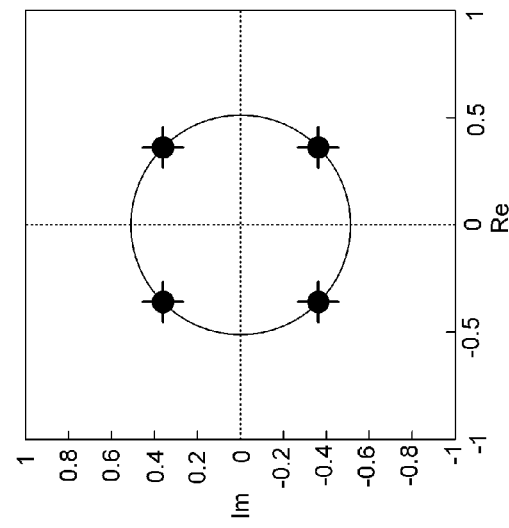

FIGS. 2A-C illustrates an example embodiment in which constellation points are defined on a pair of two concentric amplitude shells. FIG. 2A illustrates a 2-dimensional projection in the Re-Im plane, and shows the constellation points located on the inner and outer amplitude shells, which have amplitudes (i.e. radii) of $R_B$ and $R_A$, respectively. Preferably, the radii $R_A$ and $R_B$ are selected to minimize the ideal back-to-back RSNR at a specified uncoded bit error rate, as well as the variance of the symbol energy between successive signaling intervals, i.e. to achieve constellation power balancing. As may be appreciated, in some embodiments, different amplitude shells $R_A^X$, $R_B^X$ and $R_A^Y$, $R_B^Y$ may be assigned to each of the X- and Y-polarizations, respectively, while in other embodiments the constellation points may be distributed near but not necessarily on a particular amplitude shell. In such cases, nonlinear interference may be reduced in part by ensuring that the variance of the symbol energy divided by the square of the average symbol energy, $\epsilon$, is such that $\epsilon \leq 0.05$. In other embodiments, the radii of the two amplitude shells are constrained such that $R_A^X = R_A^Y = R_A$ and $R_B^X = R_B^Y = R_B$ together with $R_A^2 + R_B^2 = 1$, which reduces $\epsilon$ to approximately zero.

A 2-bit QPSK constellation may be defined on the inner amplitude shell, and a 3-bit 8PSK constellation may be defined on the outer amplitude shell. Each symbol of the modulation is constructed using one point selected from the QPSK constellation on the inner amplitude shell, and one point selected from the 8PSK constellation on the outer amplitude shell. Thus, the symbol constellation may be constructed as follows:

One bit of the data signal may be used to select one of the two polarizations (i.e. X-pol or Y-pol.) to be used for transmitting the outer amplitude shell $R_A$. If the X-pol is selected for the outer amplitude shell $R_A$, as shown in FIG. 2B, then the Y-pol is necessarily selected for the inner amplitude shell $R_B$. In this case, a transmitted symbol is composed of a 3-bit constellation point modulated on the X-pol based on the 8PSK constellation of the outer shell; and a 2-bit constellation point modulated on the Y-pol using the QPSK constellation of the inner shell.

On the other hand, if the Y-pol is selected for the outer amplitude shell $R_A$, then the inner amplitude shell, $R_B$ is necessarily selected for the X-pol. In this case, a transmitted symbol is composed of a 2-bit constellation point modulated on the X-pol using the QPSK constellation of the inner shell, and a 3-bit constellation point modulated on the Y-pol using the 8PSK constellation of the outer shell.

In some embodiments, the one bit used to select the polarization for the outer amplitude shell $R_A$ may correspond with a most significant bit of the data signal. In this case, the two or three next most significant bits may be encoded for transmission on the X-pol, while the least significant bits are encoded for transmission on the Y-pol, or vice versa.

It will be seen that this approach yields a total of 2×8×4=64 possible symbol combinations, which encodes $\log_2(64) = 6$ bits across the combined X- and Y-polarizations. This represents a spectral efficiency of 6 bits per signaling interval, which is equivalent to standard DP-8QAM modulation. Further, it will be seen that the modulation is distributed over 4 dimensions of the optical signal (Re and Im axes of two polarizations of one signaling interval). In view of these features, the modulation format of FIG. 2 may be referred to as "4D-8QAM".

At the receiver, 4D-8QAM symbols are preferably decoded using all 4 dimensions of the modulation, using samples obtained from both the X- and Y-polarizations. Decoding 4D-8QAM symbols by treating each polarization independently (i.e. 2 decoding) results in >0.5 dB RSNR penalty relative to 4D decoding.

The Applicants have found that selecting $R_A \approx 0.89$ and $R_B \approx 0.46$ yields an ideal back-to-back RSNR of approximately 8.73 dB at 0.034 uncoded BER in a linear channel with A WGN, which may be compared with an RSNR of 9.16 dB for standard DP-8QAM. Further, the Applicants have found that the RSNR of 4D-8QAM may be reduced to about 8.69 dB by optimizing the relative angular separations of points within the outer amplitude shell's 8PSK constellation and selecting $R_A \approx 0.90$ and $R_B \approx 0.44$, as shown schematically in FIG. 3.

Figure 3:
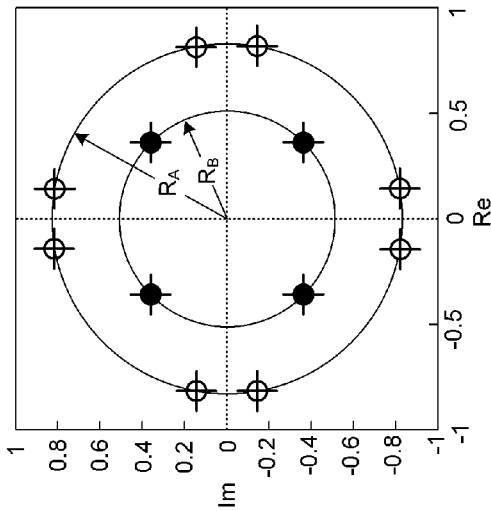
FIG. 3 illustrates a 4D-8QAM signal constellation in accordance with another embodiment of the present invention.

Further, in some embodiments, the relative angular separations of points within the 8PSK and/or QPSK constellations may also be optimized for improved performance of carrier phase recovery during coherent optical detection. For example, as shown in FIG. 3, it may be advantageous to modify the relative angular separation of points within the outer amplitude shell's 8PSK constellation to achieve $a \sim \pi/2$ constellation rotational symmetry, as opposed to $\pi/8$ for standard 8PSK. This approach may reduce the probability of cycle slip events in high nonlinear phase noise environments, at the cost of an increased ideal back-to-back RSNR.

As noted above, if X-pol is modulated using a constellation point on amplitude shell $R_A$, then Y-pol is necessarily modulated using a constellation point on amplitude shell $R_B$, and vice versa. Since in some embodiments $R_A^2 + R_B^2 = 1$, it follows that the energy of the combined symbol, which is proportional to $|X|^2 + |Y|^2$, is identical for all symbols. This property, which may be referred to as power balancing, significantly improves nonlinear performance on both dispersion managed and low net dispersion links. On dispersion uncompensated systems, the (9.16−8.69)=0.47 dB reduction in ideal back-to-back RSNR leads to an expected 0.71 dB improvement in maximum system margin relative to conventional DP-8QAM after propagation through fiber at optimum channel power.

Figure 4:
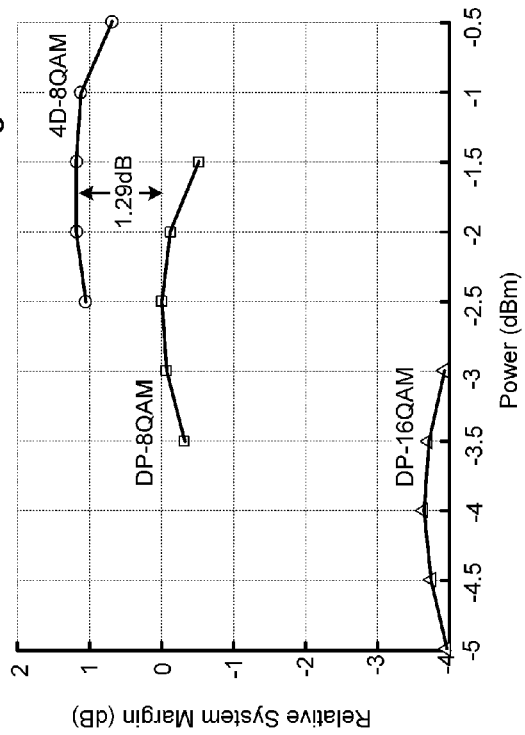
FIG. 4 is a chart illustrating system margin of DP-16QAM and 4D-8QAM modulations, relative to the maximum system margin of DP-8QAM modulation, over 1600 km of large effective area fiber (LEAF) with 90% inline optical dispersion compensation.

FIG. 4 is a chart showing the system margin of 4D-8QAM relative to the maximum system margin (MSM) of standard DP-8QAM, as a function of launch power for 9 WDM channels with 37.5 GHz channel spacing propagating over 1600 km (e.g. 20 spans of 80 km each) of large effective area fiber (LEAF) with 90% inline optical dispersion compensation. The corresponding system margin for DP-16QAM is also shown for comparison. As may be seen in FIG. 4, the MSM of 4D-8QAM exceeds that of standard DP-8QAM by 1.29 dB. This improvement in system margin implies that 4D-8QAM modulation in accordance with the present invention significantly reduces nonlinear interference relative to DP-8QAM on dispersion-managed optical networks.

Figure 5:
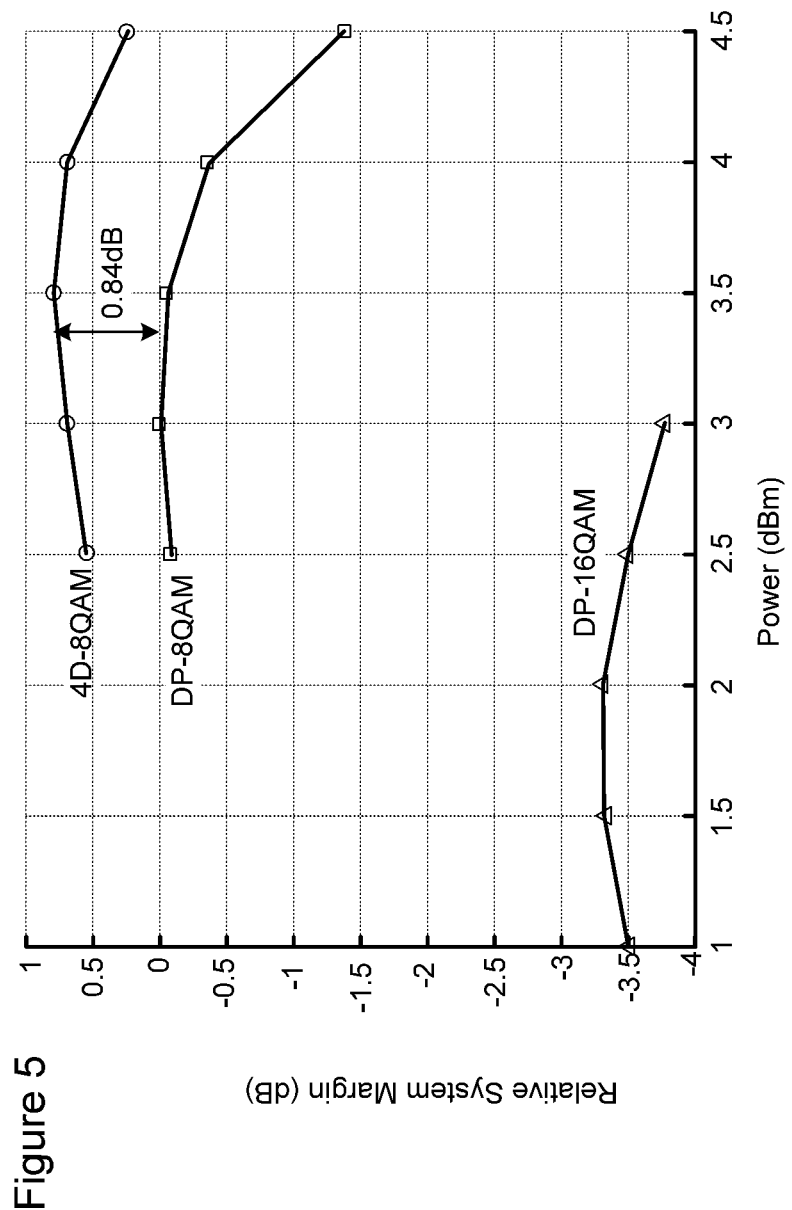
FIG. 5 is a chart illustrating system margin of DP-16QAM and 4D-8QAM modulations, relative to the maximum system margin of DP-8QAM modulation, over 1200 km of dispersion uncompensated non-dispersion shifted fiber (NDSF).

Similarly, as shown in FIG. 5, the MSM of 4D-8QAM exceeds that of standard DP-8QAM by 0.84 dB for 1200 km of dispersion-uncompensated non-dispersion shifted fiber (NDSF). As will be appreciated, the MSM improvements of 4D-8QAM illustrated in FIGS. 4 and 5 demonstrate the advantages of the present invention over standard DP-8QAM in practical optical communications networks.

The embodiments of the invention described above are intended to be illustrative only. The scope of the invention is therefore intended to be limited solely by the scope of the appended claims.

We claim:

1. A method of transmitting a data signal through an optical communications system, the method comprising:
encoding the data signal to generate symbols to be modulated onto an optical carrier in successive signaling intervals, each symbol encoding a plurality of bits of data and comprising a first constellation point selected from a first constellation and a second constellation point selected from a second constellation, wherein the first and second constellations have respective different average amplitudes, each of the first and second constellations have a cardinality of at least two and the cardinality of the first constellation is greater than the cardinality of the second constellation; and
modulating a first frame of the optical signal in accordance with the first constellation point and modulating a second frame of the optical signal in accordance with the second constellation point;
wherein a selection of one frame of the optical signal to be used as the first frame of the optical signal encodes at least 1 bit of data.

2. The method of claim 1, wherein the first and second frames of the optical signal comprise respective first and second sub-carrier wavelengths of the optical signal.

3. The method of claim 1, wherein the first and second frames of the optical signal comprise respective first and second polarizations of the optical signal.

4. The method of claim 3, wherein a selection of either an X-polarization or a Y-polarization of the optical signal as the first frame encodes 1 bit of data; the first constellation is a phase shift keying constellation that encodes 3 bits of data, and the second constellation is a phase shift keying constellation that encodes 2 bits of data.

5. The method of claim 3, wherein the 1 bit of data used to select either the X-polarization or the Y-polarization of the optical signal as the first frame corresponds with a most significant bit (MSB) of the data signal, the next most significant bits are encoded for transmission on the X-polarization, and the least significant bits of the data signal are encoded for transmission on the Y-polarization.

6. The method of claim 3, wherein the 1 bit of data used to select either the X-polarization or the Y-polarization of the optical signal as the first frame corresponds with a most significant bit (MSB) of the data signal, the next most significant bits are encoded for transmission on the Y-polarization, and the least significant bits of the data signal are encoded for transmission on the X-polarization.

7. The method of claim 3, wherein the 1 bit of data used to select either the X-polarization or the Y-polarization of the optical signal as the first frame corresponds with a least significant bit (LSB) of the data signal, the next least significant bits are encoded for transmission on the X-polarization, and the most significant bits of the data signal are encoded for transmission on the Y-polarization.

8. The method of claim 3, wherein the 1 bit of data used to select either the X-polarization or the Y-polarization of the optical signal as the first frame corresponds with a least significant bit (LSB) of the data signal, the next least significant bits are encoded for transmission on the Y-polarization, and the most significant bits of the data signal are encoded for transmission on the X-polarization.

9. A transmitter for transmitting a data signal through an optical communications system, the transmitter being configured to modulate an optical carrier in successive signaling intervals to generate and optical signal for transmission through the optical communications system, the transmitter comprising:
an encoder configured to encode the data signal to generate symbols to be modulated onto the optical carrier, each symbol encoding a plurality of bits of data and comprising a first constellation point selected from a first constellation and a second constellation point selected from a second constellation, wherein the first and second constellations have respective different average amplitudes, each of the first and second constellations have a cardinality of at least two and the cardinality of the first constellation is greater than the cardinality of the second constellation; and
a modulator configured to modulate a first frame of the optical signal in accordance with the first constellation point and modulate a second frame of the optical signal in accordance with the second constellation point;

wherein a selection of one frame of the optical signal to be used as the first frame of the optical signal encodes at least 1 bit of data.

10. The transmitter of claim 9, wherein the first and second constellations are selected such that a variance of symbol energy of two successively transmitted symbols divided by the square of the average energy of these symbols is at most 0.05.

11. The transmitter of claim 10, wherein each symbol encodes 6 bits of data.

12. The transmitter of claim 10, wherein the respective amplitudes of the first and second constellations are selected such that $R_A^2 + R_B^2 = 1$, where $R_A$ is a first radius indicative of the average amplitude of the first constellation and $R_B$ is a second radius indicative of the average amplitude of the second constellation.

13. The transmitter of claim 10, wherein each of the first and second constellations comprise a respective plurality of complex valued points, and the encoder is configured to encode the data signal by selecting one complex valued point from the first constellation, and selecting one complex valued point from the second constellation.

14. The transmitter of claim 9, wherein the first and second frames of the optical signal comprise respective first and second sub-carrier wavelengths of the optical signal.

15. The transmitter of claim 9, wherein the first and second frames of the optical signal comprise respective first and second polarizations of the optical signal.

16. The transmitter of claim 15, wherein a selection of either an X-polarization or a Y-polarization of the optical signal as the first frame encodes 1 bit of data; the first constellation is a phase shift keying constellation that encodes 3 bits of data, and the second constellation is a phase shift keying constellation that encodes 2 bits of data.

17. The transmitter of claim 15, wherein the 1 bit of data used to select either the X-polarization or the Y-polarization of the optical signal as the first frame corresponds with a most significant bit (MSB) of the data signal, the next most significant bits are encoded for transmission on the X-polarization, and the least significant bits of the data signal are encoded for transmission on the Y-polarization.

18. The transmitter of claim 15, wherein the 1 bit of data used to select either the X-polarization or the Y-polarization of the optical signal as the first frame corresponds with a most significant bit (MSB) of the data signal, the next most significant bits are encoded for transmission on the Y-polarization, and the least significant bits of the data signal are encoded for transmission on the X-polarization.

19. The transmitter of claim 15, wherein the 1 bit of data used to select either the X-polarization or the Y-polarization of the optical signal as the first frame corresponds with a least significant bit (LSB) of the data signal, the next least significant bits are encoded for transmission on the X-polarization, and the most significant bits of the data signal are encoded for transmission on the Y-polarization.

20. The transmitter of claim 15, wherein the 1 bit of data used to select either the X-polarization or the Y-polarization of the optical signal as the first frame corresponds with a least significant bit (LSB) of the data signal, the next least significant bits are encoded for transmission on the Y-polarization, and the most significant bits of the data signal are encoded for transmission on the X-polarization.

21. A receiver for receiving a data signal through an optical communications system, the receiver comprising:
a detector configured to detect modulation of at least two frames of a received optical signal and to generate the corresponding sample streams; and
a processor configured to process the sample streams from the detector to compute estimates of constellation points modulated by a transmitter on each transmitted dimension of the received optical signal, and determine a most likely value of each transmitted symbol, each transmitted symbol encoding a plurality of bits of data and including a first constellation point selected from a first constellation and a second constellation point selected from a second constellation, wherein the first and second constellations have respective different average amplitudes, each of the first and second constellations having a cardinality of at least two and the cardinality of the first constellation is greater than the cardinality of the second constellation, the first and second constellation points being modulated by the transmitter onto respective first and second transmitted frames of an optical signal, and a selection of one frame of the optical signal to be used as the first frame of the optical carrier encodes at least 1 bit of data.

22. The receiver of claim 21, wherein the first and second frames of the optical signal comprise respective first and second sub-carrier wavelengths of the optical signal.

23. The receiver of claim 21, wherein the first and second frames of the optical signal comprise respective first and second polarizations of the optical signal.

* * * * *